(12) United States Patent
Kaul

(10) Patent No.: US 7,231,329 B1
(45) Date of Patent: Jun. 12, 2007

(54) ENHANCED ELLIPTIC GRID GENERATION

(75) Inventor: Upender K. Kaul, Fremont, CA (US)

(73) Assignee: United States of America as Represented by the Administrator of the National Aeronautics and Space Administration (NASA), Washington, DC (US)

( * ) Notice: Subject to any disclaimer, the term of this patent is extended or adjusted under 35 U.S.C. 154(b) by 490 days.

(21) Appl. No.: 10/706,478

(22) Filed: Nov. 7, 2003

Related U.S. Application Data

(60) Provisional application No. 60/425,750, filed on Nov. 7, 2002.

(51) Int. Cl.
*G06F 7/60* (2006.01)
*G06F 17/10* (2006.01)
*G01D 3/00* (2006.01)
*G06F 19/00* (2006.01)
*G01F 1/68* (2006.01)

(52) U.S. Cl. .............................. 703/2; 702/113; 73/861

(58) Field of Classification Search ................... 703/2; 73/75, 861; 702/113
See application file for complete search history.

(56) References Cited

U.S. PATENT DOCUMENTS 5,923,329 A * 7/1999 Beale .......................... 345/418
6,064,810 A * 5/2000 Raad et al. ................... 703/23

OTHER PUBLICATIONS

Zheng et al., "Development of Three-Dimesional DRAGON Grid Technology", NASA, Nov. 1999, 36 pgs.*

Houstis, et al., "PELLPACK: A Problem-Solving Enivironment for PDE-Based Applications on Multicomputer Platforms", ACM Transactions on Mathematical Coftware, Mar. 1998, vol. 24, No. 1, pp. 30-73.*

Judy Challinger, "Scalable Parallel Volumne Raycasting for Nonrectilinear Computational Grids", IEEE, 1993, pp. 81-88, 111.*

Weissbein et al., "Solution of the 3-D Euler Equations for the Flow About a Fighter Aircraft Configuration Using a Hypercube Parallel Processor", ACM, 1988, pp. 1127-1136.*

Eca, "2D Orthogonal Grid Generation with Boundary Point Distribution Control", J computer Physics, May 1996, pp. 440-453 Academic Press, Inc.*

Akcelik et al., Nearly Orthogonal Two-Dimensional Grid Generation with Aspect Ratio Control, J. Comput. Phys, Aug. 10, 2001, 805-821, 171, Academic Press.

Alter, et al., Elliptic volume grid generation for viscous CFD parametri . . . , Proceedings of AIAA Fluid Dynamics Conference, 27th, New Orleans, LA, Jun. 17-20, 1996, AIAA, Inc.

ECA, 2D Orthogonal Grid Generation with Boundary Point Distribution Control, J. Comput. Phys., May 1996, 440-453, 125, Academic Press, Inc.

Jeng, et al., Two-Dimensional Elliptic Grid Solver Using Boundary Grid Control and Curvature Correction, AIAA J., Feb. 2000, 217-224, 38-2, AIAA, Inc.

Kaul, New boundary constraints for elliptic systems used in grid generation problems, J. Comput. Phys., 2003, 476-492, 189, Elsevier Science B. V.

(Continued)

*Primary Examiner*—Kamini Shah
*Assistant Examiner*—Suzanne Lo
(74) *Attorney, Agent, or Firm*—John F. Schipper; Robert M. Padilla; Diana M. Cox

(57) ABSTRACT

Method and system for generating an elliptic grid in generalized coordinates in two or three dimensions, where one or more decay parameters near a boundary segment of a grid are determined as part of the grid solution, rather than being prescribed initially by a user. The decay parameters may vary with one or more generalized coordinates and determine the rate(s) at which separation distances between adjacent grid lines change as one moves toward or away from a grid boundary segment.

8 Claims, 2 Drawing Sheets

OTHER PUBLICATIONS

Kaul, et al., A. Comparative Study of the Parabolized Navier-Stokes Code Using Various Grid-Generation Tecni . . . , Computers & Fluids, 1985, 421-441, 13-4, Pergamon Press Ltd.

Kaul, et al., Automated Gear Teeth Grid Generation via Solution of Ellipt . . . , Proceedings of SIAM Conference on Geometric Design and Computing, Nov. 5-8, 2001, Sacramento, CA.

Kaul, et al., Elliptic Grid Generation of Spiral-Bevel Pinion Gear Typical of OH-58 Helicopter Transmission, Feb. 2002, NASA TM-2002-210932.

Ryskin, et al., Orthogonal Mapping, J. Comput. Phys., 1983, 71-100, 50, Academic Press, Inc.

Sorenson, Three-Dimensional Elliptic Grid generation About Fighter Aircraft for Zonal Finit . . . , Proceeds of AIAA 24th Aerospace Sciences Meeting, Jan. 6-9, 1986, Reno, Nevada.

Steger, et al., Automatic Mesh-Point Clustering Near a Boundary in Grid Generation with Elliptic Partial Differential Equations, J. Comput. Phys., 1979, 405-410, 33.

Thompson, Grid Generation Techniques in Computational Fluid Dynamics, AIAA J., 1984, 1505-1523, 22-11, AIAA, Inc.

Thompson, et al., Automatic Numerical Generation of Body-fitted Curvilinear Coordinate System for Field Contai . . . , J. Comput. Phys., 1974, 299-319, 15, Academic Press, Inc.

Thompson, et al., TOMCAT—A Code for Numerical Generation of Boundary-Fitted Curvilinear Coordinate Systems . . . , J. Comput. Phys., 1977, 274-302, 24, Academic Press, Inc.

Thompson, et al., Boundary-Fitted Coordinate Systems for Numerical Solution Partial Differential Equations-- . . . , J. Comput. Phys., 1982, 1-108, 47, Academic Press, Inc.

Visbal, et al., Generation of Orthogonal and Nearly Orthogonal Coordinates with Grid Control Near Boundaries, AIAA J., 1982, 305-315, 20-3, AIAA, Inc.

* cited by examiner

ENHANCED ELLIPTIC GRID GENERATION

CROSS REFERENCE TO RELATED APPLICATIONS

This application claims the benefit of U.S. Provisional Application 60/425,750 filed Nov. 7, 2002.

ORIGIN OF THE INVENTION

The invention described herein was made by an employee of the United States Government and may be manufactured and used by or for the Government for governmental purposes without the payment of any royalties thereon or therefor.

TECHNICAL FIELD

The present invention is a method for eliminating requirements for parameter inputs for generalized grid generation in modeling of engineering systems.

BACKGROUND OF THE INVENTION

A large amount of effort has been devoted to developing, enhancing and using grid generation techniques, through solution of elliptic partial differential equations ("PDEs"). Elliptic grid generation methods generally focus on developing body-conforming grids around bodies for simulations of external fluid flow. The grids thus generated are smooth, having at least continuous first and second derivatives, appropriately stretched or clustered, and are orthogonal over most of the grid domain. Inclusion of inhomogeneous terms in the PDEs allows a grid to satisfy clustering and orthogonality properties in the vicinity of specific surfaces in three dimensions and in the vicinity of specific lines in two dimensions.

Following the work of Thompson, Thames and Mastin, Jour. Computational Physics, vol. 24, 1977, pp. 274–302, three-dimensional governing equations for elliptic grid generation are often expressed as:

$$\xi_{xx}+\xi_{yy}+\xi_{zz}=P(\xi,\eta,\zeta)=-a_i \cdot sgn(\xi-\xi_i)\exp\{-b_i|\xi-\xi_i|\}, \quad (1A)$$

$$\eta_{xx}+\eta_{yy}+\eta_{zz}=Q(\xi,\eta,\zeta)=-c_i \cdot sgn(\eta-\eta_i)\exp\{-d_i|\eta-\eta_i|\}, \quad (1B)$$

$$\zeta_{xx}+\zeta_{yy}+\zeta_{zz}=R(\xi,\eta,\zeta)=-e_i \cdot sgn(\zeta-\zeta_i)\exp\{-f_i|\zeta-\zeta_i|\}, \quad (1C)$$

where $\xi$, $\eta$, and $\zeta$ are generalized curvilinear coordinates, x, y and z are Cartesian coordinates, and $P(\xi,\eta,\zeta)$, $Q(\xi,\eta,\zeta)$ and $R(\xi,\eta,\zeta)$, are inhomogeneous terms, $a_i$, $b_i$, $c_i$, $d_i$, $e_i$ and $f_i$ are manually selected constants, and the subscript "i" refers to a particular boundary component associated with the problem.

In a two dimensional study by Steger and Sorensen, Jour. Computational Physics, vol. 33, 1979, pp 405–410, the authors use the following governing equations, $$\xi_{xx}+\xi_{yy}=-a_i \cdot sgn(\eta-\eta_i)\exp\{-d_i|\eta-\eta_i|\}, \quad (1D)$$

$$\eta_{xx}+\eta_{yy}=-c_i \cdot sgn(\eta-\eta_i)\exp\{-d_i|\eta-\eta_i|\}, \quad (1E)$$

for a given $\eta$ boundary. The quantities $a_i$ and $c_i$ are generalized to functions $a_i(\xi)$ and $c_i(\xi)$, respectively, and the values of these quantities are computed as part of the solution by requiring a specified spacing between a given $\eta$ boundary and an adjacent grid line, and grid orthogonality at this $\eta$ boundary. In any two dimensional problem, the decay parameters, such as $d_i$, must be prescribed or manually inserted for each of the boundaries in any coordinate direction. However, as will be seen in the subsequent development, these values of $d_i$ are coupled with the values computed for the quantities $a_i$ and $c_i$ respectively so that explicit prescriptions of values for the parameters $d_i$ are in conflict with the values computed for $a_i$ and for $c_i$. Further, the process of selecting the two values for the parameters $d_i$ for two opposing boundaries, and, by extension, four values for four boundaries in a two dimensional problem, is cumbersome for static grids and is infeasible where dynamically changing grids are required. In three dimensions, the parameter values need to be prescribed for six boundaries, one for each of six boundaries.

What is needed is an approach that provides an automatic procedure for generating an elliptic grid that does not require manual insertion or user prescription of these decay parameters for a two dimensional or three dimensional grid generation problem. Preferably, these decay parameters should allow for a variable rate of decay from different points on any grid boundary, should arise automatically in the formulation and solution of the problem and should permit an interpretation in terms of one or more physical quantities associated with the problem.

SUMMARY OF THE INVENTION

These needs are met by the invention, which provides a process for generating an elliptic grid in which (1) grid points tend to cluster near a boundary at a desired rate, which may vary from point to point where one or more coordinate variables may undergo a relatively large change in value), (2) grid lines corresponding to a constant value of a coordinate are approximately parallel to or perpendicular to the local boundary line, and (3) user prescription or manual insertion of parameters to achieve a desired grid behavior in terms of clustering and orthogonality near boundaries is not required (or allowed). The process includes the following steps:

providing defining equations, valid near at least one boundary segment in a generalized coordinate system, of a selected grid system, where each of the defining equations has at least two independent Cartesian coordinate variables, has at least one generalized coordinate as a dependent variable, and comprises a partial differential equation, expressed in at least one generalized coordinate;

providing a selected group of boundary constraints for the grid system, valid near the at least one boundary segment, where a decay parameter for at least one of the generalized coordinate dependent variables near the at least one boundary segment is determined as part of a solution for the grid system, rather than being prescribed initially;

providing defining equations and selected boundary conditions, having at least two independent coordinate variables and at least one dependent variable, for steady state heat transfer on a long thin fin, and providing a correspondence between the at least two independent coordinate variables for the grid system near the at least one grid boundary segment with the at least two independent coordinate variables for the heat transfer problem;

providing a correspondence between a selected power of at least one heat transfer coefficient for the heat transfer problem and at least one decay parameter for the grid system near the at least one grid boundary segment; and determining a solution of the grid system near the at least one grid boundary segment that incorporates at least one boundary constraint comprising the at least one decay parameter determined for the grid system.

DESCRIPTION OF BEST MODES OF THE INVENTION

Figure 1:
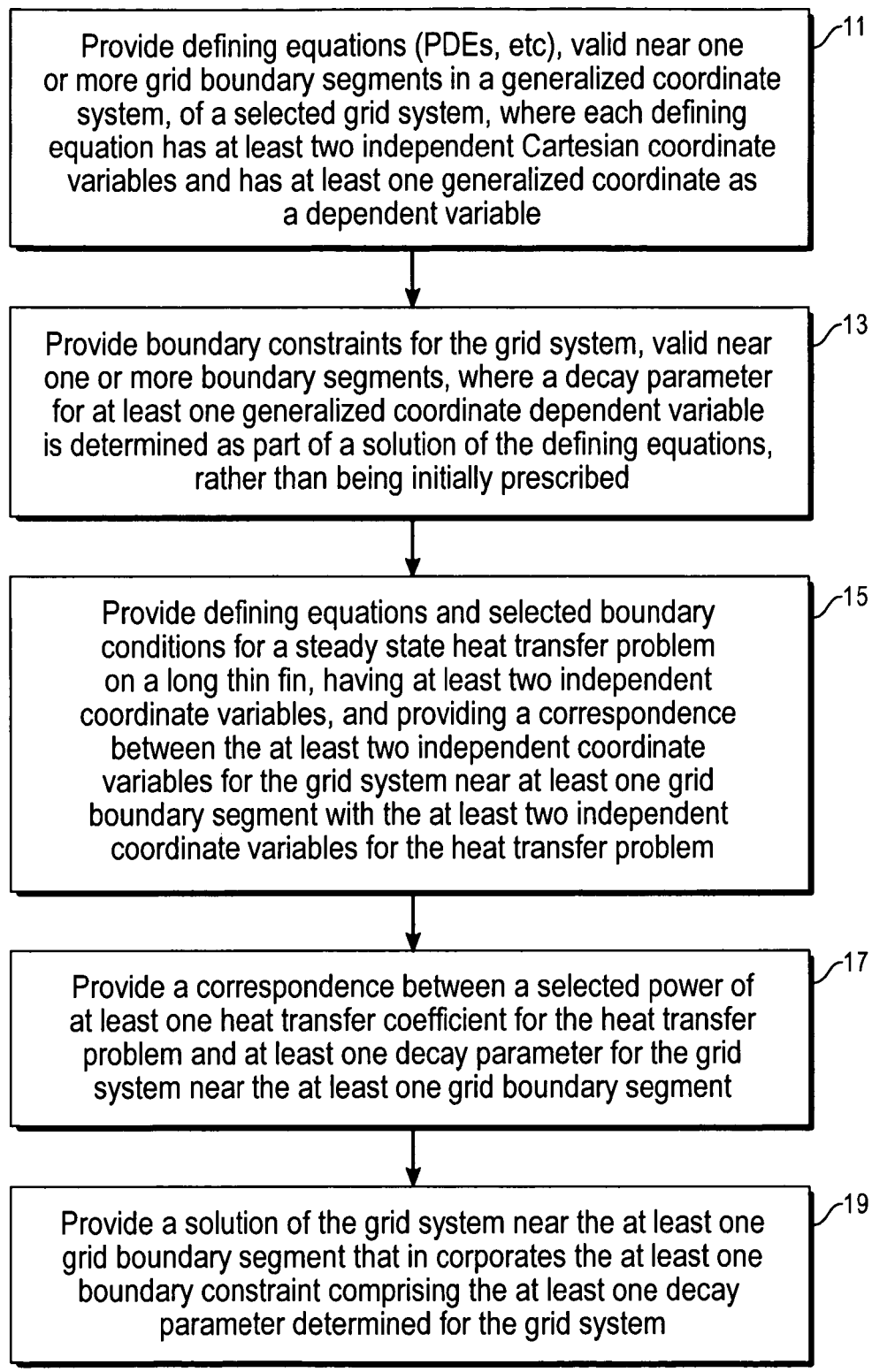
FIG. 1 is a flow chart of a procedure for practicing the invention.

The equations (1A), (1B) and (1C) are modified here in the context of equations (1D) and (1E) and are written in the following form, as a six-equation set for each of the $(\xi,\eta,\zeta)$ boundaries, where $a_{k,i}=a_{k,i}(\eta,\zeta)$, $c_{k,i}=c_{k,i}(\xi,\zeta)$, and $e_{k,i}=e_{k,i}(\xi,\eta)$ (k=1, 2, 3). The decay parameters $b_i$, $d_i$ and $f_i$ are (positive) constants for any given boundary segment and are expressed as parameter functions, $b_i(\eta,\zeta)$, $d_i(\xi,\zeta)$, and $f_i(\xi,\eta)$. Without loss of generality, one can assume that near a given $\xi$-boundary segment i, $\xi-\xi_i \geq 0$, in a selected region on one side of this boundary segment, where sgn$(\xi-\xi_i)>0$. Treatment of a situation with sgn$(\xi-\xi_i)<0$ is analogous. In a region close to this boundary segment, where $b_i(\eta,\zeta)|\xi-\xi_i|<<1$, the defining equations and the nonhomogeneous terms have the forms $$\xi_{xx}+\xi_{yy}+\xi_{zz}=p_1(\xi,\eta,\zeta), \quad (2A)$$

$$\eta_{xx}+\eta_{yy}+\eta_{zz}=q_1(\xi,\eta,\zeta), \quad (2B)$$

$$\zeta_{xx}+\zeta_{yy}+\zeta_{zz}=r_1(\xi,\eta,\zeta), \quad (2C)$$

$$p_1(\xi,\eta,\zeta)=-a_{1,i}(\eta,\zeta)sgn(\xi-\xi_i)\exp\{-b_i(\eta,\zeta)|\xi-\xi_i|\}, \quad (2D)$$

$$\approx -a_{i,1}(\eta,\zeta)+a_{1,i}(\eta,\zeta)(\xi-\xi_i), \quad (2E)$$

$$q_1(\xi,\eta,\zeta)=-c_{i,1}(\eta,\zeta)sgn(\xi-\xi_i)\exp\{-b_i(\eta,\zeta)|\xi-\xi_i|\}, \quad (2F)$$

$$\approx -c_{1,i}(\eta,\zeta)+c_{1,i}(\eta,\zeta)(\xi-\xi_i), \quad (2G)$$

$$r_1(\xi,\eta,\zeta)=-e_{1,i}(\eta,\zeta)b_i(\eta,\zeta)(\xi-\xi_i), \quad (2H)$$

$$\approx -e_{1,i}(\eta,\zeta)+e_{1,i}(\eta,\zeta)(\xi-\xi_i), \quad (2I)$$

In a region close to an $\eta$-boundary segment, where $d_i(\xi,\zeta)|\eta-\eta_i|<<1$ and $\eta-\eta_i \geq 0$, the defining equations and the nonhomogeneous terms have the forms $$\xi_{xx}+\xi_{yy}+\xi_{zz}=p_2(\xi,\eta,\zeta), \quad (3A)$$

$$\eta_{xx}+\eta_{yy}+\eta_{zz}=q_2(\xi,\eta,\zeta), \quad (3B)$$

$$\zeta_{xx}+\zeta_{yy}+\zeta_{zz}=r_2(\xi,\eta,\zeta), \quad (3C)$$

$$p_2(\xi,\eta,\zeta)=-a_{2,i}(\xi,\zeta)sgn(\eta-\eta_i)\exp\{-d_i(\xi,\zeta)|\eta-\eta_i|\}, \quad (3D)$$

$$\approx -a_{2,i}(\xi,\zeta)+a_{2,i}(\xi,\zeta)d_i(\xi,\zeta)(\eta-\zeta_i), \quad (3E)$$

$$q_2(\xi,\eta,\zeta)=-c_{2,i}(\xi,\zeta)sgn(\eta-\eta_i)\exp\{-d_i(\xi,\zeta)|\eta-\eta_i|\}, \quad (3F)$$

$$\approx -c_{2,i}(\xi,\zeta)d_i(\xi,\zeta)(\eta-\eta_i), \quad (3G)$$

$$r_2(\xi,\eta,\zeta)=-e_{2,i}(\xi,\zeta)sgn(\eta-\eta_i)\exp\{-d_i(\xi,\zeta)|\eta-\eta_i|\}, \quad (3H)$$

$$\approx -e_{2,i}(\xi,\zeta)+e_{2,i}(\xi,\zeta)d_i(\xi,\zeta)(\eta-\eta_i), \quad (3I)$$

In a region close to an $\xi$-boundary segment, where $f_i(\xi,\eta)|\zeta-\zeta_i|<<1$ and $\zeta-\zeta_i \geq 0$, the defining equations and the nonhomogeneous terms have the forms $$\xi_{xx}+\xi_{yy}+\xi_{zz}=p_3(\xi,\eta,\zeta), \quad (4A)$$

$$\eta_{xx}+\eta_{yy}+\eta_{zz}=q_3(\xi,\eta,\zeta), \quad (4B)$$

$$\zeta_{xx}+\zeta_{yy}+\zeta_{zz}=r_3(\xi,\eta,\zeta), \quad (4C)$$

$$p_3(\xi,\eta,\zeta)=-a_{3,i}(\xi,\eta)sgn(\zeta-\zeta_i)\exp\{-f_i(\xi,\eta)|\zeta-\zeta_i|\}, \quad (4D)$$

$$\approx -a_{3,i}(\xi,\eta)+a_{3,i}(\xi,\eta)f_i(\xi,\eta)(\zeta-\zeta_i), \quad (4E)$$

$$q_3(\xi,\eta,\zeta)=-c_{3,i}(\xi,\eta)sgn(\zeta-\zeta_i)\exp\{-f_i(\xi,\eta)|\zeta-\zeta_i|\}, \quad (4F)$$

$$\approx -c_{3,i}(\xi,\eta)+c_{3,i}(\xi,\eta)f_i(\xi,\eta)(\zeta-\zeta_i), \quad (4G)$$

$$r_3(\xi,\eta,\zeta)=-e_{3,i}(\xi,\eta)sgn(\zeta-\zeta_i)\exp\{-f_i(\xi,\eta)|\zeta-\zeta_i|\}, \quad (4H)$$

$$\approx -e_{3,i}(\xi,\eta)+e_{3,i}(\xi,\eta)f_i(\xi,\eta)(\zeta-\zeta_i), \quad (4I)$$

Where the preceding approximations, near a boundary segment $\zeta=\zeta_i$, for example, are used, the defining equations for $\zeta$ become $$\xi_{xx}+\xi_{yy}+\xi_{zz}-a_{3,i}(\xi,\eta)f_i(\xi,\eta)(\zeta-\zeta_i)=-a_{3,i}(\xi,\eta)sgn(\zeta-\zeta_i), \quad (5A)$$

$$\eta_{xx}+\eta_{yy}+\eta_{zz}-c_{3,i}(\xi,\eta)f_i(\xi,\eta)(\zeta-\zeta_i)=-c_{3,i}(\xi,\eta)sgn(\zeta-\zeta_i), \quad (5B)$$

$$\zeta_{xx}+\zeta_{yy}+\zeta_{zz}-e_{3,i}(\xi,\eta)f_i(\xi,\eta)(\zeta-\zeta_i)=-e_{3,i}(\xi,\eta)sgn(\zeta-\zeta_i). \quad (5C)$$

If one ignores the nonhomogeneous terms on the right hand side of Eq. (5C) and ignores the dependence upon z (or $\zeta$), this relation is seen to represent a steady state heat transfer equation for a long, thin fin of width or height 2L, with corresponding "temperature" $\theta=\zeta-\zeta_1$, discussed, for example, by V. S. Arpaci in *Conduction Heat Transfer*, Addition Wesley, Reading, Mass., 1966, pp. 145–147 and 201–205:

$$\partial^2\theta/\partial x^2+\partial^2\theta/\partial y^2-m^2\theta=0, \quad (6)$$

$$m^2=2\ h/k\delta. \quad (7)$$

where h is a heat transfer coefficient in a selected (z–) direction, k is a thermal conductivity coefficient and $\delta(<<L)$ is thickness of the fin. Similar equations apply for $\theta=\xi-\xi_1$, and $\theta=\eta-\eta_1$.

The heat transfer coefficient h corresponds to or is proportional to, for example, a decay parameter, such as the coefficient $e_{3,i}(\xi,\eta)\cdot f_i(\xi,\zeta)$ in Eq. (4I). Similar equations are developed for the choices $\theta=\xi-\xi_1$, or $\theta=\eta-\eta_1$.

Where the heat transfer coefficient h in the z-direction is small, the thermal gradient is correspondingly large normal to the corresponding boundary in the xy-space, which requires a close clustering of isothermal lines, or of the corresponding time evolving grid lines. This provides a physical basis for the observation that clustering near a given boundary increases as a decay parameter (e.g., $m^2$ in Eq. (7)) decreases, and inversely. However, for a grid whose grid lines show a general dependence upon both coordinates, x and y (as in FIGS. 2 and 3, discussed in the following), a similar conclusion is arrived at using the following physical argument. As the heat transfer coefficient h in the z-direction decreases, the temperature gradient near a y-boundary increases correspondingly, for a given heat flux, and this leads to a denser clustering of isothermal lines (or, equivalently, of grid lines for the time evolving grid).

Boundary constraints, valid in a one-sided neighborhood of each of the four (two dimensional) or six (three dimensional) boundary segments, are incorporated by applying Green's theorem in three dimensions for each of the Eqs. (2E), (3G) and (4I) for the ξ, η and ζ boundaries, respectively:

$$\int_S (\partial\theta/\partial n)d\sigma = \int_V \{-a_{1,i}(\eta,\zeta) sgn(\xi-\xi_i) + a_{1,i}(\eta,\zeta) b_i(\eta,\zeta)\theta\} d\tau, \quad (8)$$

$$\int_S (\partial\theta/\partial n)d\sigma = \int_V \{-c_{2,i}(\xi,\zeta) sgn(\eta-\eta_i) + c_{2,i}(\xi,\zeta) d_i(\xi,\zeta)\theta\} d\tau, \quad (9)$$

$$\int_S (\partial\theta/\partial n)\partial\theta/\partial n) d\sigma = \int_V \{-e_{3,i}(\xi,\eta) sgn(\zeta-\zeta_i) + e_{3,i}(\xi,\eta) f_i(\xi,\eta)\theta\}\} d\tau, \quad (10)$$

where n refers to a direction that is locally normal to a surface S representing a totality of six surfaces including the boundary segments of interest and V is a volume enclosed or defined by the totality of these six surfaces. These integral-type boundary constraints can be used to calculate the decay parameter analogs, $a_{1,i}(\eta,\zeta) b_i(\eta,\zeta)$, $c_{2,i}(\eta,\zeta) d_i(\xi,\zeta)$ and $e_{3,i}(\eta,\xi) f_i(\xi,\eta)$. When expressed in terms of the generalized coordinates (ξ,η,ζ), the boundary constraints set forth in Eqs. (8), (9) and (10) are transformed, for ζ for example, as follows.

$$\int_S I\, d\sigma = \int_S (\partial\theta/\partial n) d\sigma = \int_S (\partial\zeta/\partial n) d\sigma \quad (11)$$

The integral $\int_S I\, d\sigma$ in Eq. (14) can be written as an algebraic sum of six integrals, evaluated over the indicated boundary segments:

$$\int_S I\, d\sigma = \int_{\xi max} I\, d\sigma + \int_{\eta max} I\, d\sigma + \int_{\zeta max} I\, d\sigma - \int_{\xi min} I\, d\sigma - \int_{\eta min} I\, d\sigma - \int_{\zeta min} I\, d\sigma, \quad (12)$$

where the surface configurations ξmax, ξmin, etc. represent the corresponding boundary segments that together make up the surface S. For the first and fourth integral pair, the second and fifth integral pair, and the third and sixth integral pair in Eq. (15), the following respective relations may be verified:

$$\int_\xi d\sigma = \int_\xi (1/J\sqrt{\alpha_{11}}) \alpha_{13} [(\eta_2+y_\eta^2+z_\eta^2)(x_\zeta^2+y_\zeta^2+z_{70}^2)]^{1/2} d\zeta d\eta. \quad (13)$$

$$\int_\eta I\, d\sigma = \int_\eta (1/J\sqrt{\alpha_{22}}) \alpha_{23} [(x_\xi^2+z_\eta^2)(x_\zeta^2+y_\zeta^2+z_\zeta^2)]^{1/2} d\xi d\zeta, \quad (14)$$

$$\int_\zeta I\, d\sigma = \int_\zeta (1/J)[\alpha_{33}(x_\eta^2+y_\eta^2+z_\eta^2)(x_\xi^2+y_\xi^2+z^{\xi 2})]^{1/2} d\eta d\xi, \quad (15)$$

$$\alpha_{11} = J^2(\xi_x^2+\xi_y^2+\xi_z^2), \quad (16A)$$

$$\alpha_{22} = J^2(\eta_x^2+\eta_y^2+\eta_z^2), \quad (16B)$$

$$\alpha_{33} = J^2(\zeta_x^2+\zeta_y^2+\zeta_z^2), \quad (16C)$$

$$\alpha_{12} = J^2(\xi_x\eta_x+\xi_y\eta_y+\xi_z\eta_z), \quad (16D)$$

$$\alpha_{13} = J^2(\xi_x\zeta_x+\xi_y\zeta_y+\xi_z\zeta_z), \quad (16E)$$

$$\alpha_{23} = J^2(\eta_x\zeta_x+\eta_y\zeta_y+\eta_z\zeta_z), \quad (16F)$$

where $J=J((x,y,z)/(\xi,\eta,\zeta))$ is a Jacobian of the transformation $(x,y,z) \to (\xi,\psi,\zeta)$.

Equations (13)–(15) can be used to express the boundary constraints in the computational space (generalized variables (ξ,ψ,ζ)), analogous to the Eqs. (8)–(10) expressed in Cartesian coordinate space. The defining equations in computational space that are solved, subject to the boundary constraints set forth in Eq. (4I) for a ζ-boundary, are $$\alpha_{11} x_{i,\xi\xi} + \alpha_{22} x_{i,\eta\eta} + \alpha_{33} x_{i,\zeta\zeta} + 2\{\alpha_{12} x_{i,\xi\eta} + \alpha_{13} x_{i,\xi\zeta} + \alpha_{23} x_{i,\eta\zeta}\} = -J^2 \{p_3 x_{i,\xi} + q_3 x_{i,\eta} + r_3 x_{i,\zeta}\}, \quad (17)$$

$$x_i = x, y \text{ or } z. \quad (18)$$

FIG. 1 is a flow chart of a suitable procedure for practicing the invention for a two dimensional or three dimensional grid system. In step 11, the system provides defining equations, valid near one or more grid boundary segments in a generalized coordinate system, of a selected grid system, where each of the defining equations has at least two independent Cartesian coordinate variables, has at one generalized coordinate as a dependent variable, and comprises a partial differential equation, expressed in at least one generalized coordinate.

In step 13, the system provides a selected group of boundary constraints for the grid system, valid near the one or more boundary segments, where a decay parameter for at least one of the generalized coordinate dependent variables near the one or more boundary segments is determined as part of a solution of the defining equations, rather than being prescribed initially.

In step 15, the system provides defining equations and selected boundary conditions, having at least two independent coordinate variables, for steady state heat transfer on a long thin fin, and the system provides a correspondence between the at least two independent coordinate variables for the grid system near at least one grid boundary segment with the at least two independent coordinate variables for the heat transfer problem.

In step 17, the system provides a correspondence a selected power of at least one heat transfer coefficient for the heat transfer problem and at least one decay parameter for the grid system near the at least one grid boundary segment.

In step 19, the system determines a solution of the grid system near the at least one grid boundary segment that incorporates at least one boundary constraint comprising the at least one decay parameter determined for the grid system.

Figure 2:
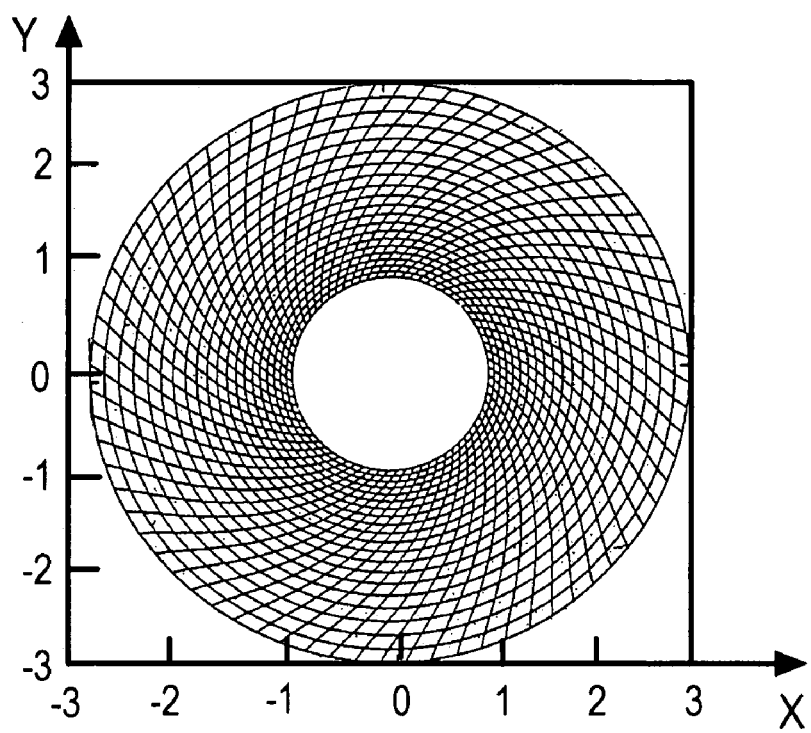
FIGS. 2 and 3 illustrate grids, computed using the invention, for a two dimensional annular region and for a two dimensional convex region, illustrating clustering of grid points near an inner boundary and near an upper boundary, respectively.

FIG. 2 illustrates a result of application of the invention to a two dimensional annular region to provide a grid in which grid points cluster near an inner boundary of the annulus. Where a geometrical system, such as an annulus, evolves with time, a grid according to the invention is developed at each of a selected sequence of times, with the parameters subject to the boundary constraints being allowed to vary from one time to another time. Each of these grids can be used to perform a finite element or finite difference analysis on the geometrical object that represents the time evolving system at one of these times.

Figure 3:
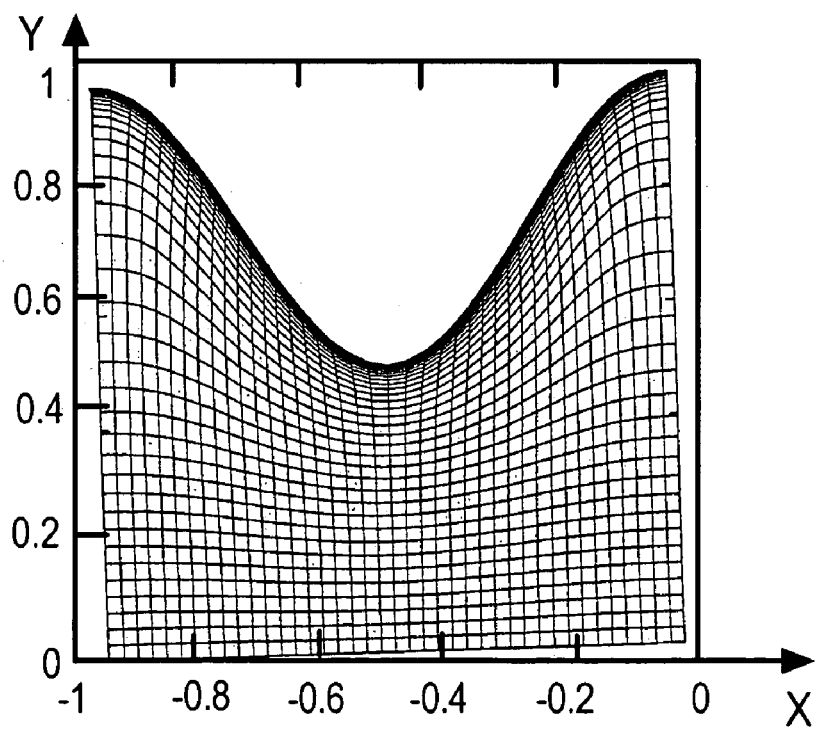

FIG. 3 illustrates a result of application of the invention to a two dimensional convex-concave geometry region to provide a grid in which grid points cluster near an upper boundary of the region.

A decay parameter, such as $e_{3,i}(\xi,\eta) \cdot f_i(\xi,\eta)$, may vary with one or more of the generalized coordinates, such as ξ and/or η, rather than being constant; and this variation is determined as part of the solution of the grid problem, rather than being prescribed initially by the user. A grid solution can be determined for a temporally constant environment. Alternatively, a time evolving environment can be allowed to vary at each of a sequence of times, and a grid solution can be determined for each of this sequence of times, using the preceding analysis at each of these times.

The preceding analysis has focused on neighborhoods of the grid boundary segments. As noted in the preceding, in an interior region, far from the grid boundary segments, the defining partial differential equations (PDEs) become homogeneous, and standard analysis of elliptic PDEs is applied to determine an interior solution, which is automatically matched in the solution process across a selected interior boundary to the solution obtained for the grid boundary segments.

What is claimed is:

1. A method for generating an elliptic grid of coordinates in two dimensions or in three dimensions, the method comprising:

providing defining equations, valid near at least one boundary segment in a generalized coordinate system, of a selected grid system, where each of the defining equations has at least two independent Cartesian coordinate variables, has at least one generalized coordinate as a dependent variable, and comprises a partial differential equation, expressed in at least one generalized coordinate;

providing a selected group of boundary constraints for the grid system, valid near the at least one boundary segment, where a decay parameter for at least one of the generalized coordinate dependent variables near the at least one boundary segment is determined as part of a solution for the grid system, rather than being prescribed initially;

providing defining equations and selected boundary conditions, having at least two independent coordinate variables and at least one dependent variable, for steady state heat transfer on a long thin fin, and providing a correspondence between the at least two independent coordinate variables for the grid system near the at least one grid boundary segment with the at least two independent coordinate variables for the heat transfer problem;

providing a correspondence between a selected power of at least one heat transfer coefficient for the heat transfer problem and at least one decay parameter for the grid system near the at least one grid boundary segment;

determining a solution of the grid system near the at least one grid boundary segment that incorporates at least one boundary constraint comprising the at least one decay parameter determined for the grid system; and displaying the solution of the grid system.

2. The method of claim 1, further comprising selecting said grid system decay parameter to be directly proportional to said heat transfer coefficient.

3. The method of claim 1, further comprising permitting said at least one decay parameter to vary with at least one of said at least two generalized coordinates.

4. The method of claim 1, further comprising:

allowing an environment for said defining equations for said grid system to vary from a first time to a second time; and applying said method and said defining equations at the first time and at the second time to determine said solution of said grid system at each of the first and second times.

5. A system for generating an elliptic grid of coordinates in two dimensions or in three dimensions, the system comprising a computer that is programmed:

to provide defining equations, valid near at least one boundary segment in a generalized coordinate system, of a selected grid system, where each of the defining equations has at least two independent Cartesian coordinate variables, has at least one generalized coordinate as a dependent variable, and comprises a partial differential equation, expressed in at least one generalized coordinate;

to provide a selected group of boundary constraints for the grid system, valid near the at least one boundary segment, where a decay parameter for at least one of the generalized coordinate dependent variables near the at least one boundary segment is determined as part of a solution for the grid system, rather than being prescribed initially;

to provide defining equations and selected boundary conditions, having at least two independent coordinate variables and at least one dependent variable, for steady state heat transfer on a long thin fin, and to provide a correspondence between the at least two independent coordinate variables for the grid system near the at least one grid boundary segment with the at least two independent coordinate variables for the heat transfer problem;

to provide a correspondence between a selected power of at least one heat transfer coefficient for the heat transfer problem and at least one decay parameter for the grid system near the at least one grid boundary segment; and to determine a solution of the grid system near the at least one grid boundary segment that incorporates at least one boundary constraint comprising the at least one decay parameter determined for the grid system; and to display the solution of the grid system.

6. The system of claim 5, wherein said grid system decay parameter is directly proportional to said heat transfer coefficient.

7. The system of claim 5, wherein said at least one decay parameter varies with at least one of said at least two generalized coordinates.

8. The system of claim 5, wherein said computer is further programmed:

to allow an environment for said defining equations for said grid system to vary from a first time to a second time; and to apply said method and said defining equations at the first time and at the second time to determine said solution of said grid system at each of the first and second times.

* * * * *